US011812371B2

(12) United States Patent
Zorgui et al.

(10) Patent No.: US 11,812,371 B2
(45) Date of Patent: Nov. 7, 2023

(54) ADAPTIVE NODE ACTIVATION AND CONFIGURATION IN COOPERATIVE SENSING

(71) Applicant: QUALCOMM Incorporated, San Diego, CA (US)

(72) Inventors: Marwen Zorgui, San Diego, CA (US); Srinivas Yerramalli, Hyderabad (IN); Rajat Prakash, San Diego, CA (US); Xiaoxia Zhang, San Diego, CA (US); Roohollah Amiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 17/448,686

(22) Filed: Sep. 23, 2021

(65) Prior Publication Data
US 2022/0104111 A1 Mar. 31, 2022

Related U.S. Application Data

(60) Provisional application No. 63/084,523, filed on Sep. 28, 2020.

(51) Int. Cl.
H04W 48/16 (2009.01)
(52) U.S. Cl.
CPC ................... H04W 48/16 (2013.01)
(58) Field of Classification Search
CPC .................................................. H04W 48/16
See application file for complete search history.

(56) References Cited

U.S. PATENT DOCUMENTS

2012/0146788 A1 6/2012 Wilson et al.
2020/0084278 A1 3/2020 Cheng et al.
(Continued)

FOREIGN PATENT DOCUMENTS

| EP | 3099089 A1 | 11/2016 |
| WO | 2014011552 A1 | 1/2014 |
| WO | 2019012361 A1 | 1/2019 |

OTHER PUBLICATIONS

International Search Report and Written Opinion—PCT/US2021/071579—ISA/EPO—dated Jan. 19, 2022.
(Continued)

Primary Examiner — Diane D Mizrahi
(74) Attorney, Agent, or Firm — Patterson & Sheridan, L.L.P.

(57) ABSTRACT

Certain aspects of the present disclosure provide techniques for adaptive node activation and configuration in cooperative sensing. A method that may be performed by a sensing management function (SnMF) entity includes receiving a first radio frequency (RF) sensing request, from a first entity, for scanning an environment to detect at least a first object, initiating a first RF sensing session in the environment in response to the first RF sensing request, receiving a second RF sensing request, from a second entity, for scanning the environment to detect at least a second object during the first RF sensing session, accommodating the second RF sensing request using output from the first RF sensing session, wherein the first RF sensing session is ongoing, detecting the first and second objects in the environment, and transmitting information about the detected first and second object to the first and second entity, respectively.

30 Claims, 11 Drawing Sheets

(56) References Cited

U.S. PATENT DOCUMENTS

2021/0014656 A1* 1/2021 Mueck .................... H04W 4/40
2022/0110018 A1* 4/2022 Jha ..................... H04W 28/0289

OTHER PUBLICATIONS

Kaltiokallio O., et al., "A Novel Bayesian Filter for RSS-Based Device-Free Localization and Tracking", IEEE Transactions on Mobile Computing, IEEE Service Center, Los Alamitos, CA, US, vol. 20, No. 3, Dec. 11, 2019 (Dec. 11, 2019), pp. 780-795, XP011836957, ISSN: 1536-1233, DOI:10.1109/TMC.2019.2953474, [retrieved on Feb. 3, 2021] paragraph 3 paragraph 5.

* cited by examiner

\* Minimum Required Information to Find $(x_{target}, y_{target})$

|  | If gNB Needs to Locate the Target | If UE Needs to Locate the Target (Note 1) |
|---|---|---|
| Location of the Counterpart | $(x_{UE}, y_{UE})$ | $(x_{gNB}, y_{gNB})$ |
| Range of the Reflected Path | $R_{reflected}$ | |
| AoA or AoD | $\theta_{target}$ | $\phi_{target}$ |

700A

700B

ADAPTIVE NODE ACTIVATION AND CONFIGURATION IN COOPERATIVE SENSING

CROSS-REFERENCE TO RELATED APPLICATION

This application claims benefit of and priority to U.S. Provisional Application No. 63/084,523 filed Sep. 28, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for radio frequency (RF) sensing and adaptive node activation and configuration in cooperative sensing.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved adaptive node activation and configuration in cooperative sensing, such as for example, cooperative RF sensing.

Certain aspects of the subject matter described in this disclosure can be implemented in a method for wireless communication. The method generally includes receiving a first radio frequency (RF) sensing request, from a first entity, for scanning an environment to detect an at least a first object, initiating a first RF sensing session in the environment in response to the first RF sensing request, receiving a second RF sensing request, from a second entity, for scanning the environment to detect at least a second object during the first RF sensing session, wherein the first RF sensing session is ongoing, accommodating the second RF sensing request using output from the first ongoing RF sensing session, detecting the first and second objects in the environment during the first sensing session, transmitting information about the detected first object to the first entity and transmitting information about the detected second object to the second entity.

Certain aspects of the subject matter described in this disclosure can be implemented in a method for wireless communication. The method generally includes receiving an RF sensing request, from an entity, for scanning an environment to detect at least one object; initiating a first portion of an RF sensing session in the environment in response to the RF sensing request, wherein a location of the at least one object is detected based on RF sensing performed by a first set of devices; initiating a second portion of the RF sensing session refining the location of the at least one object based on RF sensing performed by a subset of the first set of devices; detecting the at least one object in the environment during the second portion of the RF sensing session; and transmitting information about the at least one detected object to the entity.

Certain aspects of the subject matter described in this disclosure can be implemented in an apparatus for wireless communication. The apparatus generally includes at least one processor; and a memory coupled to the at least one processor, the memory including instructions executable by the at least one processor to cause the apparatus to: receive a first RF sensing request, from a first entity, for scanning an environment to detect an at least a first object, initiate a first RF sensing session in the environment in response to the first RF sensing request, receive a second RF sensing request, from a second entity, for scanning the environment to detect at least a second object during the first RF sensing session, wherein the first RF sensing session is ongoing, accommodate the second RF sensing request using output from the first ongoing RF sensing session, detect the first and second objects in the environment during the first sensing session, transmit information about the detected first object to the first entity, and transmit information about the detected second object to the second entity.

Certain aspects of the subject matter described in this disclosure can be implemented in an apparatus for wireless communication. The apparatus generally includes at least one processor; and a memory coupled to the at least one processor, the memory including instructions executable by the at least one processor to cause the apparatus to: receive an RF sensing request, from an entity, for scanning an environment to detect at least one object; initiate a first portion of an RF sensing session in the environment in response to the RF sensing request, wherein a location of the at least one object is detected based on RF sensing performed by a first set of devices; initiate a second portion of the RF sensing session refining the location of the at least one object based on RF sensing performed by a subset of the first set of devices; detect the at least one object in the environment during the second portion of the RF sensing session; and transmit information about the at least one detected object to the entity.

Certain aspects of the subject matter described in this disclosure can be implemented in an apparatus for wireless communication. The apparatus generally includes means for receiving a first RF sensing request, from a first entity, for scanning an environment to detect an at least a first object, means for initiating a first RF sensing session in the environment in response to the first RF sensing request, means for receiving a second RF sensing request, from a second entity, for scanning the environment to detect at least a second object during the ongoing first RF sensing session, means for accommodating the second RF sensing request using output from the first RF sensing session, wherein the first RF sensing session is ongoing, means for detecting the first and second objects in the environment during the first sensing session, means for transmitting information about the detected first object to the first entity, and means for transmitting information about the detected second object to the second entity.

Certain aspects of the subject matter described in this disclosure can be implemented in an apparatus for wireless communication. The apparatus generally includes means for receiving an RF sensing request, from an entity, for scanning an environment to detect at least one object; means for initiating a first portion of an RF sensing session in the environment in response to the RF sensing request, wherein a location of the at least one object is detected based on RF sensing performed by a first set of devices; means for initiating a second portion of the RF sensing session refining the location of the at least one object based on RF sensing performed by a subset of the first set of devices; means for detecting the at least one object in the environment during the second portion of the RF sensing session; and means for transmitting information about the at least one detected object to the entity.

Certain aspects of the subject matter described in this disclosure can be implemented in a non-transitory computer-readable medium having computer executable code stored thereon. The non-transitory computer-readable medium having computer executable code stored thereon generally includes code for receiving a first RF sensing request, from a first entity, for scanning an environment to detect an at least a first object, code for initiating a first RF sensing session in the environment in response to the first RF sensing request, code for receiving a second RF sensing request, from a second entity, for scanning the environment to detect at least a second object during the first RF sensing session, wherein the first RF sensing session is ongoing, code for accommodating the second RF sensing request using output from the first ongoing RF sensing session, code for detecting the first and second objects in the environment during the first sensing session, code for transmitting information about the detected first object to the first entity, and code for transmitting information about the detected second object to the second entity.

Certain aspects of the subject matter described in this disclosure can be implemented in a non-transitory computer-readable medium having computer executable code stored thereon. The non-transitory computer-readable medium having computer executable code stored thereon generally includes code for receiving an RF sensing request, from an entity, for scanning an environment to detect at least one object; code for initiating a first portion of an RF sensing session in the environment in response to the RF sensing request, wherein a location of the at least one object is detected based on RF sensing performed by a first set of devices; code for initiating a second portion of the RF sensing session refining the location of the at least one object based on RF sensing performed by a subset of the first set of devices; code for detecting the at least one object in the environment during the second portion of the RF sensing session; and code for transmitting information about the at least one detected object to the entity.

Certain aspects can be implemented in a computer program product for wireless communication embodied on a computer-readable storage medium. The computer-readable storage medium may comprise code for receiving a first RF sensing request, from a first entity, for scanning an environment to detect an at least a first object, code for initiating a first RF sensing session in the environment in response to the first RF sensing request, code for receiving a second RF sensing request, from a second entity, for scanning the environment to detect at least a second object during the ongoing first RF sensing session, code for accommodating the second RF sensing request using output from the first RF sensing session, wherein the first RF sensing session is ongoing, code for detecting the first and second objects in the environment during the first sensing session, code for transmitting information about the detected first object to the first entity, and code for transmitting information about the detected second object to the second entity.

Certain aspects can be implemented in a computer program product for wireless communication embodied on a computer-readable storage medium. The computer-readable storage medium may comprise code for receiving an RF sensing request, from an entity, for scanning an environment to detect at least one object; initiating a first portion of an RF sensing session in the environment in response to the RF sensing request, wherein a location of the at least one object is detected based on RF sensing performed by a first set of devices; initiating a second portion of the RF sensing session refining the location of the at least one object based on RF sensing performed by a subset of the first set of devices; detecting the at least one object in the environment during the second portion of the RF sensing session; and transmitting information about the at least one detected object to the entity.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended drawings set forth certain features for purposes of illustration.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure, and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
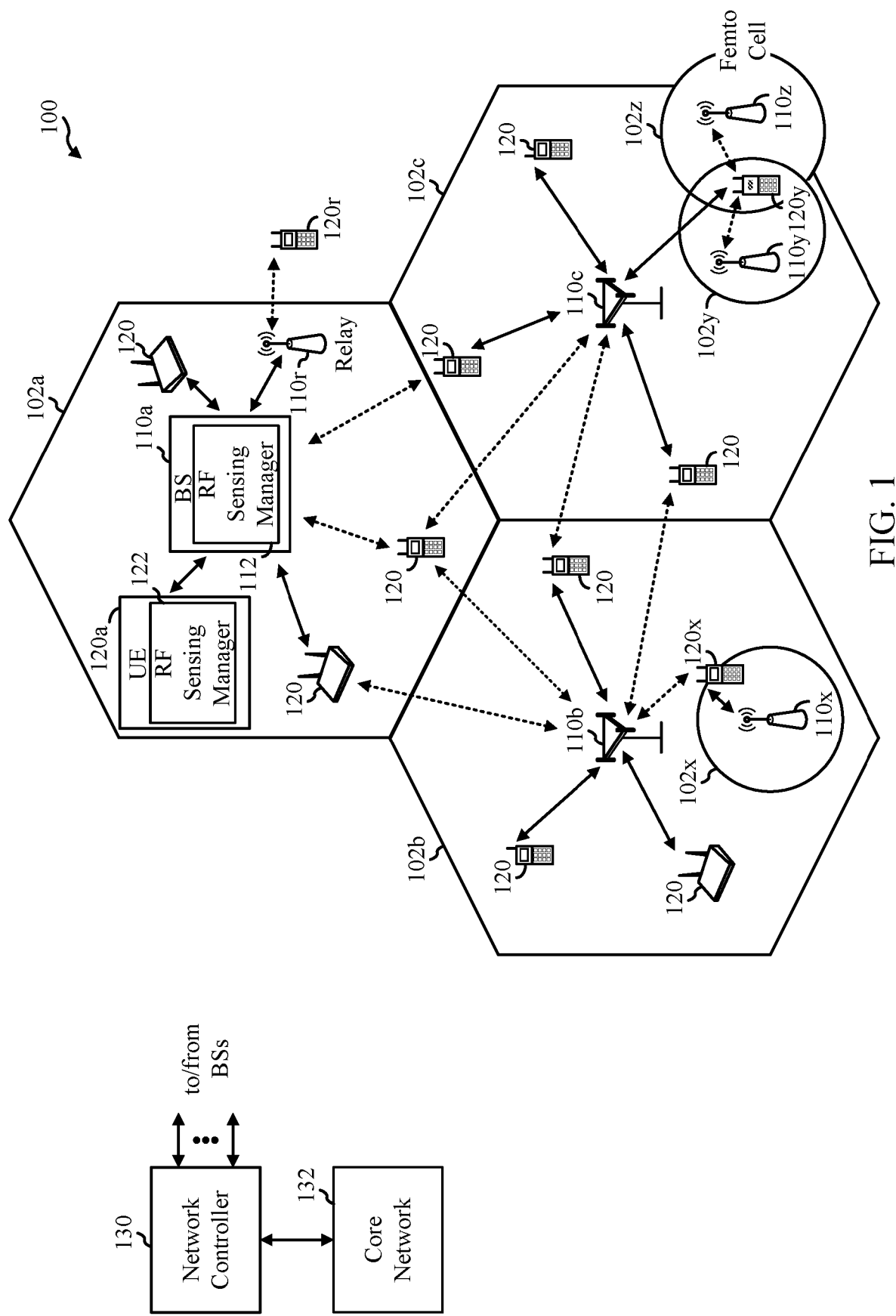
FIG. 1 is a block diagram conceptually illustrating an example wireless communication network, in accordance with certain aspects of the present disclosure.

Aspects of the present disclosure provide apparatus, methods, processing systems, and computer-readable mediums for adaptive node activation and configuration in cooperative sensing.

In 5G new radio (NR), wireless systems equipped for radio frequency (RF) communication may also be equipped for RF sensing. RF sensing is consumer-level radar with advanced detection capabilities. Using RF sensing, wireless systems may be equipped for, among other things, health monitoring (e.g., heartbeat detection, respiration rate monitoring), gesture recognition (e.g., human activity recognition, keystroke detection, sign language recognition), contextual information acquisition, location detection (e.g., direction, range estimation), and automotive radar (e.g., smart cruise control, collision avoidance).

A network entity with access to NR-enabled RF sensing, may use cooperative sensing protocols to determine, among other things, the location and range of a device-free target within the signaling range of the network. In certain cases, a network entity may employ multiple NR-enabled devices to perform multi-static radar techniques, allowing the network entity to efficiently and accurately identify the position of a target.

Multi-static radar techniques may increase accuracy of RF sensing proportional to a higher number of network devices acting as transmitters and/or receivers. However, a higher number of transmitters and/or receivers increases the load traffic associated with sensing and result in delays. In one illustrative example, in an indoor factory where nodes frequently engage in remote sensing, transmission collisions may cause retransmissions and reporting delays.

In accordance with certain aspects of the present disclose, a network entity may alter the configuration parameters used during multi-static radar sensing while maintaining RF sensing accuracy by utilizing cooperative sensing procedures in accordance with the techniques described herein.

The following description provides examples of adaptive node activation and configuration in cooperative sensing in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. An RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave (mmWave), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations frequency range 1 (FR1) (410 megahertz (MHz)-7.125 gigahertz (GHz)) and frequency range 2 (FR2) (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. Multiple-input multiple-output (MIMO) transmissions with precoding may also be supported. MIMO configurations in the downlink (DL) may support up to 8 transmit antennas with multi-layer DL transmissions up to 8 streams and up to 2 streams per UE. Multi-layer transmissions with up to 2 streams per user equipment (UE) may be supported. Aggregation of multiple cells may be supported with up to 8 serving cells.

Example Wireless Communications System

FIG. 1 illustrates an example wireless communication network 100 in which aspects of the present disclosure may be performed. Wireless communication network 100 may be a New Radio (NR) system (e.g., a 5G NR network). As shown in FIG. 1, wireless communication network 100 may be in communication with a core network 132. Core network 132 may be in communication with one or more base station (BSs) 110a-z (each also individually referred to herein as BS 110 or collectively as BSs 110) and/or user equipments (UEs) 120a-y (each also individually referred to herein as UE 120 or collectively as UEs 120) in the wireless communication network 100 via one or more interfaces.

According to certain aspects, BSs 110 and UEs 120 may be configured for radio frequency (RF) sensing. As shown in FIG. 1, BS 110a includes an RF sensing manager 112 configured for adaptive node activation and configuration in cooperative sensing, in accordance with certain aspects of the present disclosure. Similarly, UE 120a includes an RF sensing manager 122 configured for adaptive node activation and configuration in cooperative sensing, in accordance with certain aspects of the present disclosure.

A BS 110 may provide communication coverage for a particular geographic area, sometimes referred to as a "cell", which may be stationary or may move according to the location of a mobile BS 110. In some examples, BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, BSs 110a, 110b and 110c may be macro BSs for macro cells 102a, 102b and 102c, respectively. BS 110x may be a pico BS for a pico cell 102x. BSs 110y and 110z may be femto BSs for the femto cells 102y and 102z, respectively. A BS 110 may support one or multiple cells.

BSs 110 communicate with UEs 120 in wireless communication network 100. UEs 120 (e.g., 120x, 120y, etc.) may be dispersed throughout wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, network controller 130 may be in communication with core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

In NR-enabled RF sensing, a network entity referred to as a sensing management function (SnMF) entity is responsible for supporting, managing, and keeping track of the sensing output of wireless communication network 100. The SnMF may be a separate entity, part of network controller 130, part of one or more BSs 110, part of one or more UEs 120, part of a location management function (LMF) entity, or may have functionalities split across any combination of entities in wireless communication network 100. The SnMF entity or entity/combination of network entities performing the sensing management performs the operations described herein, such as operations 800 and 900 illustrated in FIGS. 8 and 9, respectively.

Figure 2:
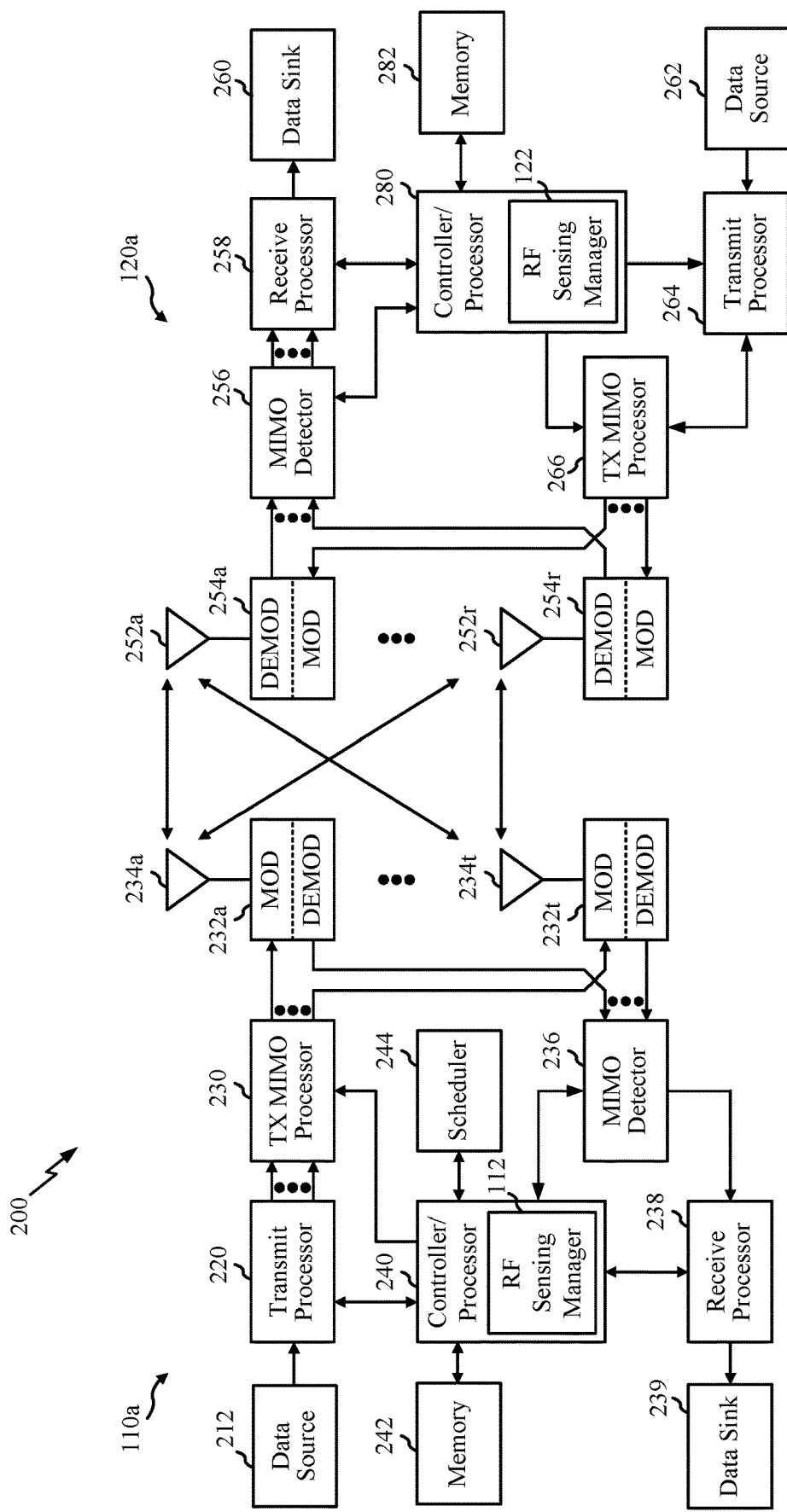
FIG. 2 is a block diagram conceptually illustrating a design of an example base station (B S) and user equipment (UE), in accordance with certain aspects of the present disclosure.

FIG. 2 illustrates example components of BS 110a and UE 120a (e.g., in wireless communication network 100 of FIG. 1), which may be used to implement aspects of the present disclosure.

At BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. A medium access control (MAC)-control element (CE) (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a downlink (DL) signal. DL signals from the modulators in transceivers 232a-232t may be transmitted via antennas 234a-234t, respectively.

At UE 120a, antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for UE 120a to a data sink 260, and provide decoded control information to a controller/processor 280.

On the uplink (UL), at UE 120a, a transmit processor 264 may receive and process data (e.g., for the PUSCH) from a data source 262 and control information (e.g., for the physical uplink control channel (PUCCH) from controller/processor 280. Transmit processor 264 may also generate reference symbols for a reference signal (RS) (e.g., for the sounding reference signal (SRS)). The symbols from transmit processor 264 may be precoded by a TX MIMO processor 266 if applicable, further processed by the modulators in transceivers 254a-254r (e.g., for single-carrier frequency division multiplexing (SC-FDM), etc.), and transmitted to BS 110a. At BS 110a, the UL signals from UE 120a may be received by antennas 234, processed by the demodulators in transceivers 232a-232t, detected by a MIMO detector 236 if applicable, and further processed by a receive processor 238 to obtain decoded data and control information sent by UE 120a. Receive processor 238 may provide the decoded data to a data sink 239 and the decoded control information to controller/processor 240.

Memories 242 and 282 may store data and program codes for BS 110a and UE 120a, respectively. A scheduler 244 may schedule UEs 120 for data transmission on the DL and/or UL.

Antennas 252, processors 266, 258, 264, and/or controller/processor 280 of UE 120a and/or antennas 234, processors 220, 230, 238, and/or controller/processor 240 of BS 110a may be used to perform the various techniques and methods described herein. For example, as shown in FIG. 2, controller/processor 240 of BS 110a has an RF sensing manager 112 that may be configured for participating in adaptive node activation and in cooperative sensing, in accordance with certain aspects of the present disclosure. Similarly, as shown in FIG. 2, controller/processor 280 of UE 120a has an RF sensing manager 122 that may be configured for participating in adaptive node activation cooperative sensing, in accordance with certain aspects of the present disclosure. Although shown at the controller/processor, other components of UE 120a and BS 110a may be used to perform the operations described herein.

NR may utilize OFDM with a cyclic prefix (CP) on the UL and DL. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kilohertz (KHz) and other SCS may be defined with respect to the base SCS (e.g., 30 kHz, 60 kHz, 120 kHz, 240 kHz, etc.).

Figure 3:
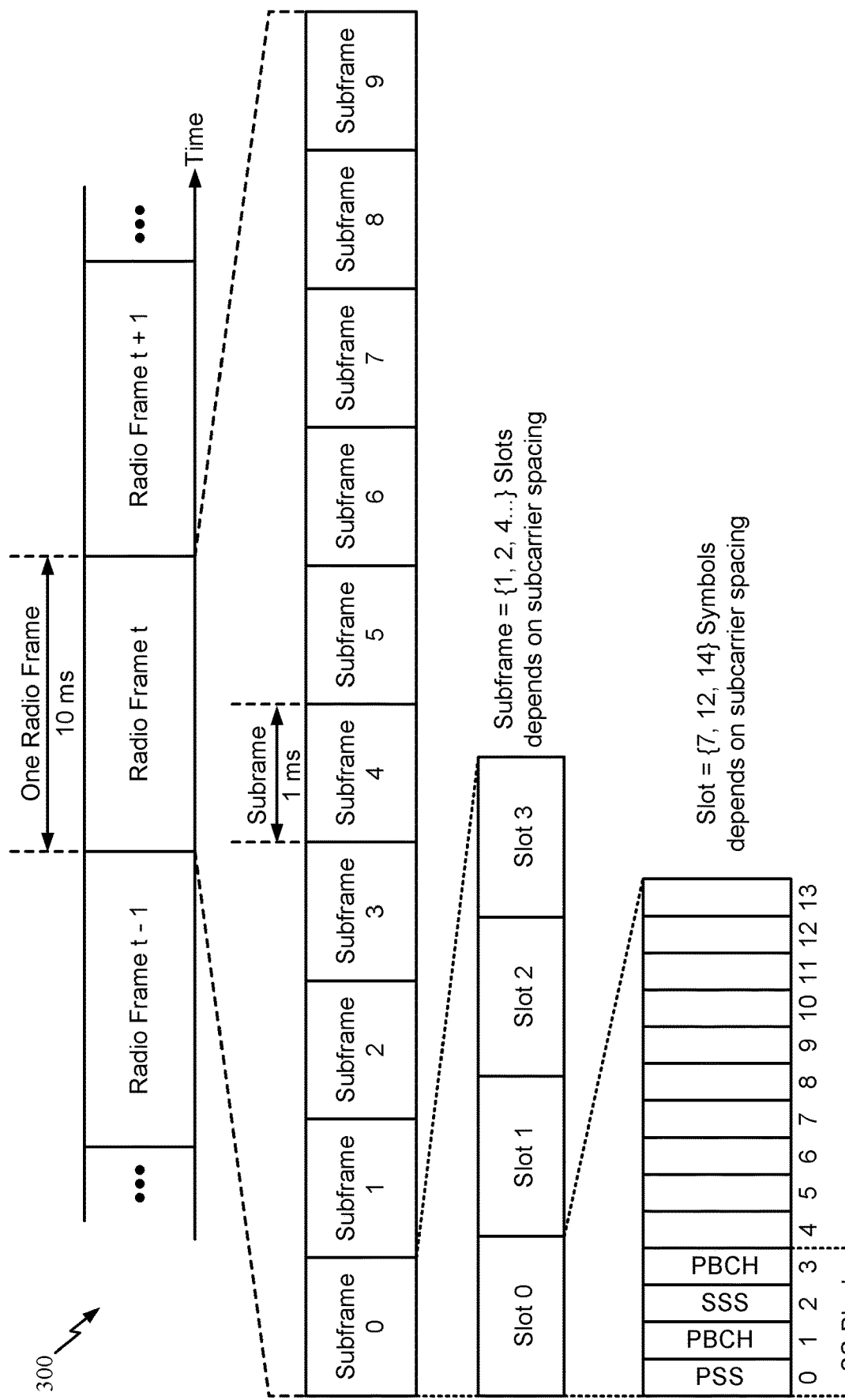
FIG. 3 is an example frame format for certain wireless communication systems (e.g., new radio (NR)), in accordance with certain aspects of the present disclosure.

FIG. 3 is a diagram showing an example of a frame format 300 for NR, in accordance with certain aspects of the present disclosure. The transmission timeline for each of the DL and UL may be partitioned into units of radio frames. Each radio frame may have a predetermined duration (e.g., 10 milliseconds (ms)) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval (TTI) having a duration less than a slot (e.g., 2, 3, or 4 symbols). Each symbol in a slot may be configured for a link direction (e.g., DL, UL, or flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, an SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, and the SSS may provide the CP length and frame timing. The PSS and SSS may provide the cell identity. The PBCH carries some basic system information, such as DL system bandwidth, timing information within radio frame, synchronization signal (SS) burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as an SS burst set. SSBs in an SS burst set may be transmitted in the same frequency region, while SSBs in different SS bursts sets can be transmitted at different frequency regions.

Example Multi-Static Radar Operation Simultaneously with an Active Millimeter Wave (mmWave) Link A network entity with access to New Radio (NR)-enabled radio frequency (RF) sensing may use cooperative sensing protocols to detect a presence of one or more device-free target objects and subsequently determine, among other things, the location and range of the one or more device-free target objects within the signaling range of the network. Device-free target objects, target objects, and objects may be used interchangeably herein. Device-free objects may be, for example, a car, a piece of furniture, or a person walking in a room. In certain cases, a network entity may employ multiple NR-enabled devices (e.g., mmWave devices) to perform multi-static radar techniques, allowing the network entity to efficiently and accurately identify the position of one or more target object. In aspects, in addition to location, the device-free target object's velocity, acceleration, etc. may be determined.

In one example, NR-enabled devices that use mmWave signaling may employ RF sensing because the mmWave signaling operates at a high frequency similar to radar. Current mmWave devices use beamforming to overcome path-loss in order to efficiently communicate. During link establishment, the mmWave devices may transmit messages in multiple directions with the intention that the intended receiver will receive the transmission in at least one of the directions. The multi-directional signals from an mmWave device may also be used for RF sensing. NR-enabled devices like, for example, an mmWave device, may be employed in a multi-static radar scheme. Devices that allow full-duplex operation may allow one antenna(s) to transmit while the other antenna(s) are receiving, allowing the device to act as both transmitter and receiver. As is known in the art, full-duplex operation/communication is the ability to transmit and receive simultaneously in the same spectrum band.

Figures 4A, 4B:
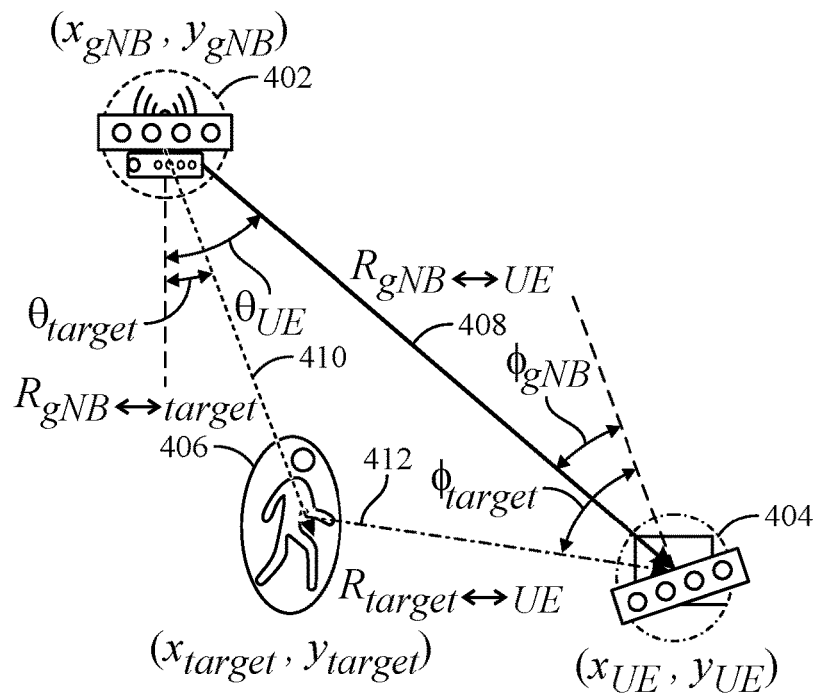
FIG. 4A is an example bi-static NR-based radar for determining the position of a target, in accordance with certain aspects of the present disclosure.
FIG. 4B is table describing the minimum required information for determining the position of a target using a bi-static NR-based radar, in accordance with certain aspects of the present disclosure.

To detect target objects within the range of a network, a network entity may use bi-static radar as illustrated in FIG. 4A. A bi-static radar is a radar in which the receiver is physically separated from the transmitter (e.g., by a considerable distance) so that the echo signal does not travel over the same path as the transmitted signal. In other words, in a bi-static radar configuration, the transmitter and receiver are not co-located.

FIG. 4A is an example bi-static NR-based radar 400A for determining the position of a target, in accordance with certain aspects of the present disclosure. As shown in the illustrative example of FIG. 4A, one BS 402 and one UE 404 may locate a target object 406 based on the transmission and reception of signals. First, BS 402 obtains the location of UE 404 by using NR positioning based on the radio travel time (RTT) and angle of arrival (AoA) of the line of sight signal 408. Second, the network obtains the location of target object 406 by using NR bi-static radar based on the time of flight (ToF) for and AoA of signal 410 and reflection signal 412.

FIG. 4B is a table 400B describing the minimum required information for determining the position of a target using a bi-static NR-based radar, in accordance with certain aspects of the present disclosure. As described in FIG. 4B, if BS 402 needs to locate target object 406, BS 402 must have information regarding the location of UE 404, the AoA or angle of departure (AoD) of target object 406, and the range of the reflected path. If UE 404 needs to locate target object 406, UE 404 must have information regarding the location of BS 402, the AoA or AoD of target object 406, and the range of the reflected path.

When a network entity employs a monostatic radar scheme (e.g., where the transmitter and receiver are co-located), a distance (D) of the detected one or more objects may be determined by measuring a round trip time for the reflecting wave (e.g., the at least one second sequence) to return to the receiving antenna of the wireless node. The distance D may be calculated based on the equation:

$$D = T\frac{C}{2}$$

where C is the speed of light, and T is the round trip time. For example, the round trip time may be the time difference between the transmission of the first sequence and the reception of the second sequence (e.g., reflection of the first sequence).

The relative speed of the object may be determined by measuring a phase offset (PO) (e.g., phase difference) between the transmitted sequence (e.g., first sequence) and the received sequence (e.g., the at least one second sequence). The phase offset PO may be equal to a frequency offset (FO) multiplied by the round trip time, parameter T. The FO may be the difference between the frequency of the at least one first sequence and the frequency of the at least one second sequence (e.g., the reflection of the first sequence). The FO may be determined based on the Doppler shift which corresponds to the speed of the detected object relative to the transmitter. The PO and the FO may be determined based on the equations:

$$PO = 2\pi \frac{S}{C} \times Fc \times T$$

$$FO = 2\pi \frac{S}{C} \times Fc$$

where S is the speed of the object to be detected relative to the transmitter, C is the speed of light, Fc is the carrier frequency, and T is the round trip time.

The reflection of the first sequence may be used to determine a material classification of the detected object. For example, the material classification may be determined by measuring the amplitude of the reflected sequence (e.g., the received second sequence) off the detected object. In particular, metal materials may reflect signals with higher energy, corresponding to higher amplitudes, as compared to human skin or wood. Thus, based on the amplitude of the reflection, the material classification of the object may be determined.

A bi-static radar scenario may be extended to a multi-static radar case (i.e., multiple BSs, and/or multiple UEs). A multi-static radar system contains multiple spatially diverse monostatic radar or bistatic radar components with a shared area of coverage.

Figure 5A:
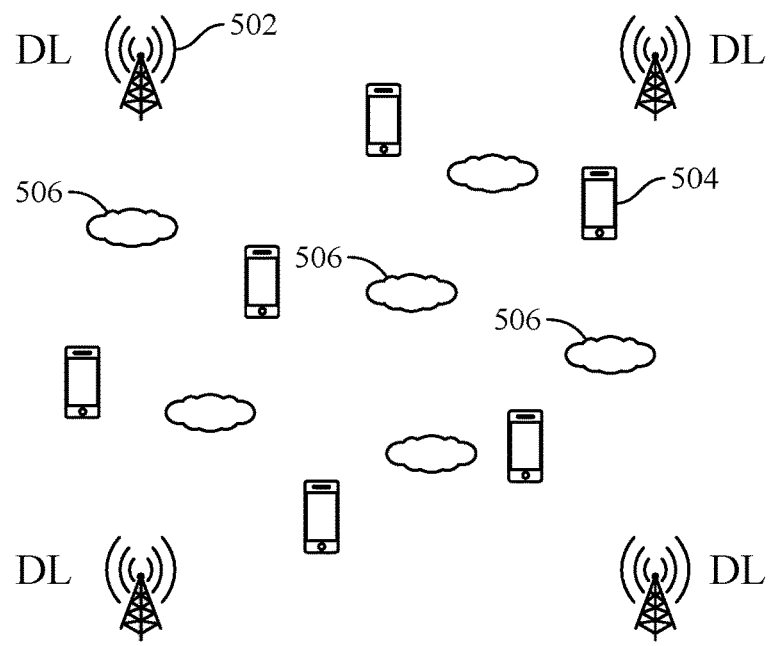
FIGS. 5A-5B are example multi-static NR-based radar schemes for the location of device-free objects, in accordance with certain aspects of the present disclosure.
Figure 5B:
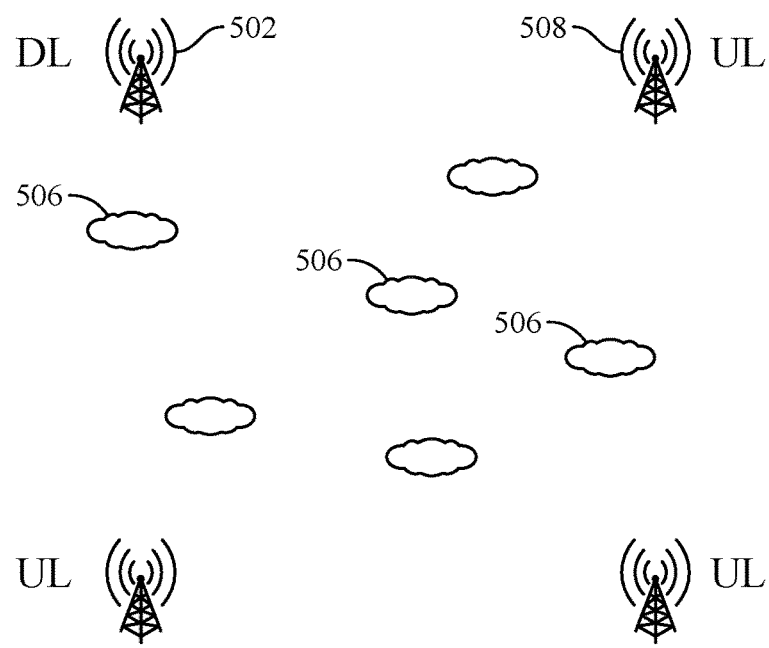

FIGS. 5A and 5B illustrate two possible use cases 500A and 500B, respectively, of multi-static, NR-based radar location detection for device-free objects (e.g., environment scanning for self-organization network (SON)), in accordance with certain aspects of the present disclosure. As shown in FIG. 5A, a network entity uses some combination of BSs 502 and UEs 504 to identify the location of target objects 506. All BSs 502 are either receiving uplink (UL) transmissions or transmitting downlink (DL) signals. In FIG. 5A, BSs 502 only transmit DL signaling to UEs 504. In this case, the network entity performs sensing intermittently when cell data traffic load is small. Such performance is distinct from positioning sessions in the current state of the art, wherein UEs 504 must be active and prepared to receive a signal from a transmission, or to transmit a signal to be processed.

In FIG. 5B, a network entity uses some combination of DL transmitting BSs 502 and UL receiving BSs 508 to identify the location of one or more target objects 506. In this case, the network entity does not utilize UEs (e.g., such as UEs 504 shown in FIG. 5A). In aspects, the BSs rotate between DL and UL. This type of sensing may be performed, for example, in indoor malls or smart factories.

For RF sensing in 5G NR, a network entity may localize objects regardless of whether those object have devices. As mentioned, device-free objects may be, for example, a car, a piece of furniture, or a person walking in a room.

Multi-static radar techniques may increase accuracy of RF sensing proportional to a higher number of network devices acting as transmitters and/or receivers. However, a higher number of transmitters and/or receivers increases the load traffic associated with sensing and result in delays. In one example, in an indoor factory where nodes frequently engage in remote sensing, transmission collisions may cause retransmissions and reporting delays. Further, certain channels, beams, timing configurations, and resource allocations may be inadequate, or inefficient, to accomplish the goals of a particular RF sensing request.

Accordingly, what is needed are techniques and/or apparatus(es) for refining RF sensing parameters in cooperative sensing procedures.

Example Adaptive Node Activation and
Configuration in Cooperative Sensing

According to certain aspects, a network entity may selectively activate and deactivate nodes (e.g., base stations (BSs) and/or user equipments (UEs)) during the course of a sensing session to optimize network performance. By activating and deactivating nodes, a network entity adds or removes the nodes from the sensing session. NR-based sensing session entities participating in RF sensing of one or more target objects concurrently perform data communication.

A network entity responsible for supporting, managing, and keeping track of the sensing output of a wireless network may be a sensing management function (SnMF) entity. The SnMF receives sensing requests from applications (e.g., outside applications, network initiated applications, UEs, etc.) and configures the network/devices in the network with the sensing parameters. Sensing parameters may include resources (e.g., signals, bandwidth), sensing and reporting methods (e.g., UE based, UE assisted), and beam management. The SnMF may be part of a network controller, part of one or more BSs, part of one or more UEs, part of a location management function (LMF), or may have functionalities split across any combination of these entities. In certain aspects, the SnMF is comparable to an LMF. In certain aspects, the SnMF is responsible with supplying network sensing parameters to the devices in the sensing session. For example, the SnMF configures the UEs, BSs, and other NR-enabled devices with the parameters of interest (e.g., bandwidth, signal, repetition, etc.).

During a multi-static NR-based sensing session, nodes (e.g., BSs and/or UEs) may be activated and de-activated in a hierarchical fashion. In certain cases, a SnMF may need to initially select useful nodes to participate in a sensing session. In one example, the SnMF may make the determination of usefulness based on an absolute location and/or relative location of the node.

When the SnMF receives a sensing request, it may not have enough node location information to engage all useful nodes at the start of the sensing session. When the nodes selected for a sensing session are some combination of UEs with unknown locations and BSs (known locations), the SnMF may configure some UEs with a positioning session to first determine their relative locations and/or absolute locations. When the nodes selected for a sensing session are only UEs, the selected UEs may use sidelink or network assistance to determine whether there are other UEs nearby which can participate in the sensing session. When the nodes selected for a sensing session are BSs (known locations), UEs with known locations, or a combination of the two, the SnMF may not need to acquire their absolute and relative locations.

In accordance with aspects of the present disclosure, an SnMF may use existing or ongoing sensing sessions to accommodate different sensing requests. If a sensing request can be satisfied using the node configuration from an ongoing sensing sessions, then a new sensing session may not be needed. In particular, in certain cases, the parameters of an existing sensing session may be modified instead of creating a new sensing session. The sensing parameters may include, among other things, activated channels, bandwidth, beams, timing, and resource selection.

In certain cases, for resource selection, it may be desirable to reuse the resources for existing sensing sessions. For example, where there is an existing sensing session to detect a moving automated guided vehicle (AGV), an SnMF may use the existing AGV sensing session to satisfy a new request for detecting a moving person near the vehicle. This may allow the SnMF to optimize network planning by limiting the number of future sensing sessions, thus prioritizing user throughput. An SnMF may accommodate a new sensing request at any point during an active sensing session for an existing sensing request.

Figure 6:
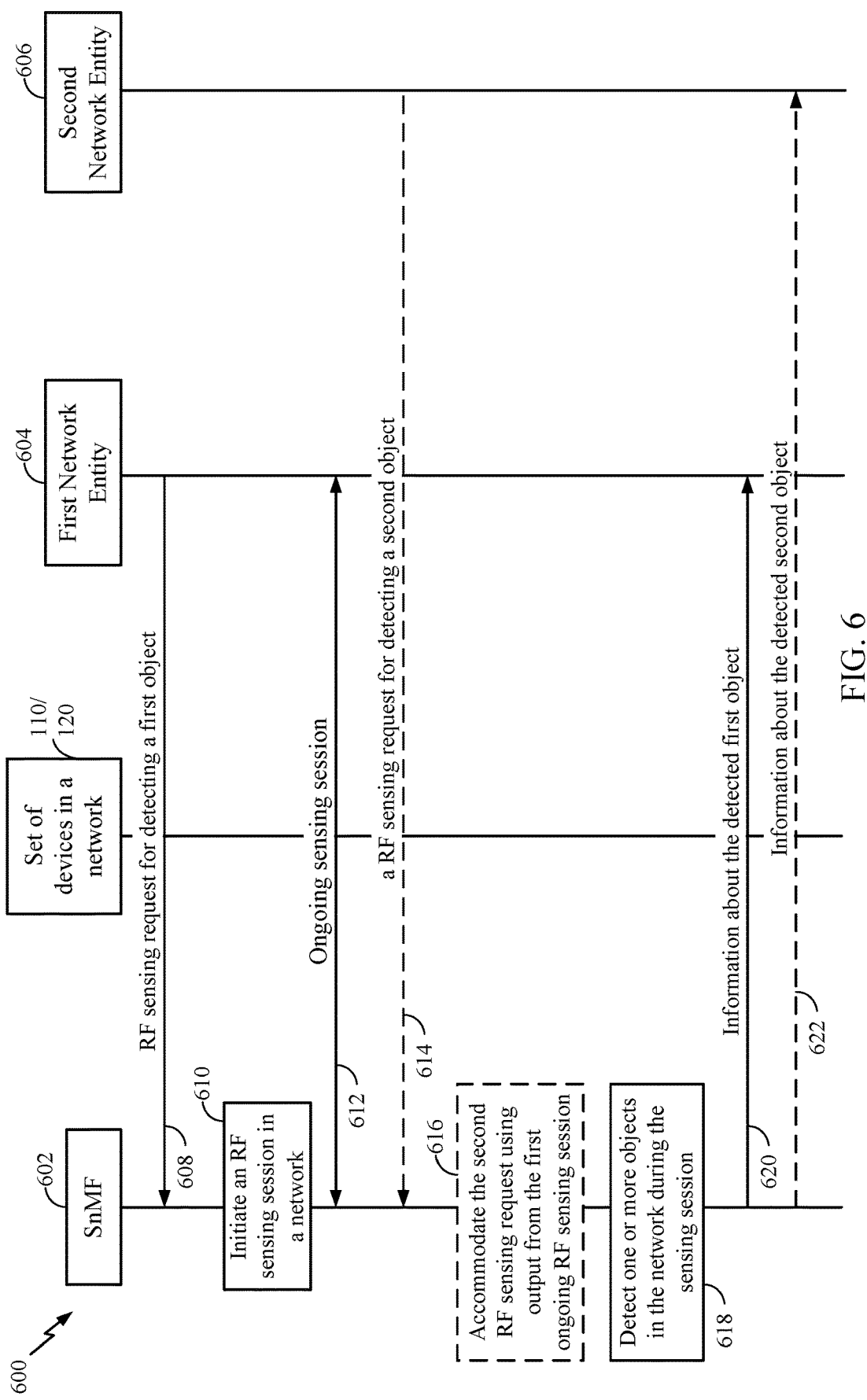
FIG. 6 is a call flow diagram illustrating example signaling for adaptive node activation and configuration in cooperative sensing, in accordance with certain aspects of the present disclosure.

FIG. 6 is a call flow diagram 600 illustrating example signaling for adaptive node activation and configuration in cooperative sensing, in accordance with certain aspects of the present disclosure. Signaling begins at 608 where a first network entity 604 transmits an RF sensing request for the purpose of detecting the presence of, at least, a first object in an environment. As described herein, the environment refers to a geographic area within the wireless communication network serviced by the SnMF.

In response to the sensing request transmitted by first network entity 604 at 608, SnMF 602 initiates a first RF sensing session in a network at 610, wherein the sensing session is an ongoing sensing session, as shown at 612. At 614, SnMF 602 may receive an RF sensing request for detecting a presence of at least a second object in the environment from second network entity 606. Second network entity 606 may be the same entity as first network entity 604, or second network entity 606 may be a different network entity. In response to the RF sensing request received by SnMF 602 at 614, SnMF 602 may, at 616, accommodate the RF sensing request (e.g., received at 614) using output from the first ongoing RF sensing session at 612. Examples of accommodating the RF sensing request are described below.

In one example, accommodating the RF sensing request involves SnMF 602 refining the ongoing sensing session at 612. First, SnMF 602 may configure a sensing session with a selected first set of nodes (e.g., BSs 110, UEs 102, and/or other network entities). The sensing session involves configuration of nodes with the sensing parameters including, among other things, time, frequency and spatial resources. SnMF 602 may receive sensing information from configured nodes of the sensing session to determine a presence and potentially a coarse target object detection of at least one target object of a set of objects. Second, SnMF 602 may adjust the sensing session for finer target object detection using a different set of nodes based, at least in part, on sensing feedback from the initial sensing session configuration. The second set of involved nodes may be a subset of the set of nodes which were part of the first set of nodes. In some cases, the second set of involved nodes may contain a subset of the initial nodes involved in the sensing session, in addition to a set of nodes newly activated for finer target object detection. SnMF 602 may also adapt the sensing configuration parameters (e.g., larger/smaller bandwidth, more/less repetitions, etc.) for the set of nodes to be used for finer object detection. The configuration may be communicated using radio resource control (RRC) signaling/medium access control (MAC) control element (CE) (MAC-CE)/downlink control information (DCI), which may allow the activated nodes to adapt rapidly to the new configuration. The activation and/or deactivation of nodes in the refining step may lead to less power consumption and/or optimized communication traffic loads, in some cases.

After refinement, SnMF 602 may, at 618, detect one or more objects in the environment during the sensing session. In an example, SnMF 602 may receive sensing information from activated nodes and use the received sensing information to compute target object information (e.g., location, velocity, acceleration, etc.). Information about the detected first object may be sent to the requesting entity (e.g., first network entity 604) at 620, and information about the detected second object may be sent to the requesting entity (e.g., second network entity 606) at 622. After the information is transmitted to the requesting entities at 620 and 622, the sensing session may be complete and end.

Resource allocation for RF sensing procedures may be carried out according to the type of service sought by a requesting entity (e.g., such as first network entity 604 and/or second network entity 606) and/or the type of signaling available during the sensing session. For example, channels available during RF sensing may be UE to UE channels, UE to BS channels, BS to UE channels, or BS to BS channels. For a given sensing request, only a subset of channels may be needed to complete the request of the requesting entity (e.g., first network entity 604/second network entity 606). The resource allocation and sensing session configuration may heavily depends on the needs of the application.

Figure 7A:
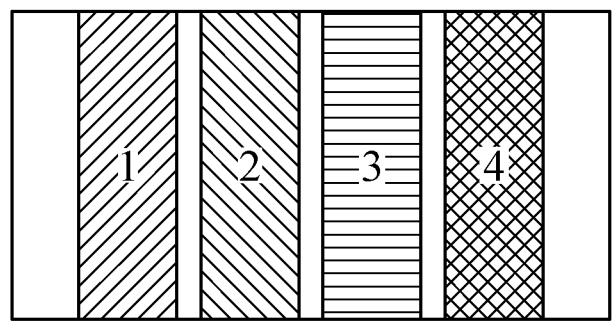
FIGS. 7A-7B are example resource allocations for NR-based sensing sessions, in accordance with certain aspects of the present disclosure.

FIG. 7A illustrates one possible resource allocation 700A during a sensing session, in accordance with certain aspects of the present disclosure. To avoid interference during transmission, SnMF 602 may allow BSs to use time-division multiplexing (TDM) to transmit at different time slots. A BS may transmit an RF signal from a first transmitter at a first slot, followed by an RF signal from a second transmitter at a second slot, and so forth. All BS to BS and BS to UE channels may be measured using this resource allocation.

Figure 7B:
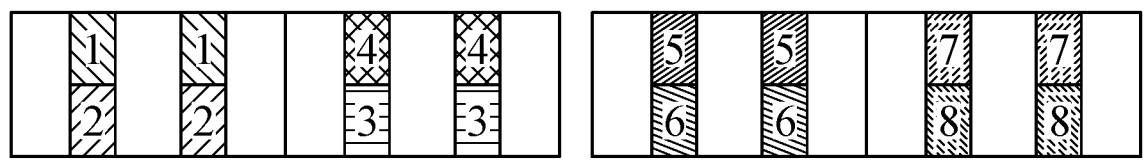

FIG. 7B illustrates another possible resource allocation 700B during a sensing session, in accordance with certain aspects of the present disclosure. To increase transmission repetition and accuracy, SnMF 602 may allow a BS and/or a UE to use frequency-division multiplexing (FDM) to transmit at different frequencies. FDM may be bandwidth split or tone interleaved. A BS and/or a UE may transmit an RF signal from a first transmitter at lower frequency in a first slot, and an RF signal from a second transmitter at a higher frequency in a first slot. This transmission may be repeated in a second slot to mitigate pathloss. A BS and/or a UE may then repeat the transmission pattern with RF signals on a third and fourth transmitter, a fifth and sixth transmitter, and so forth. In this resource allocation, only a subset of BS to BS channels and/or UE to UE channels may be measured due to half-duplex constraints at the BS or UE. For example, the channel from first transmitter to the second transmitter, or from the third transmitter to the fourth transmitter may not be measured because the RF signal from each transmitter is sent simultaneously (e.g., due to half-duplex constraints). However, all BS to UE and UE to BS channels may be measured using this resource allocation.

Figure 8:
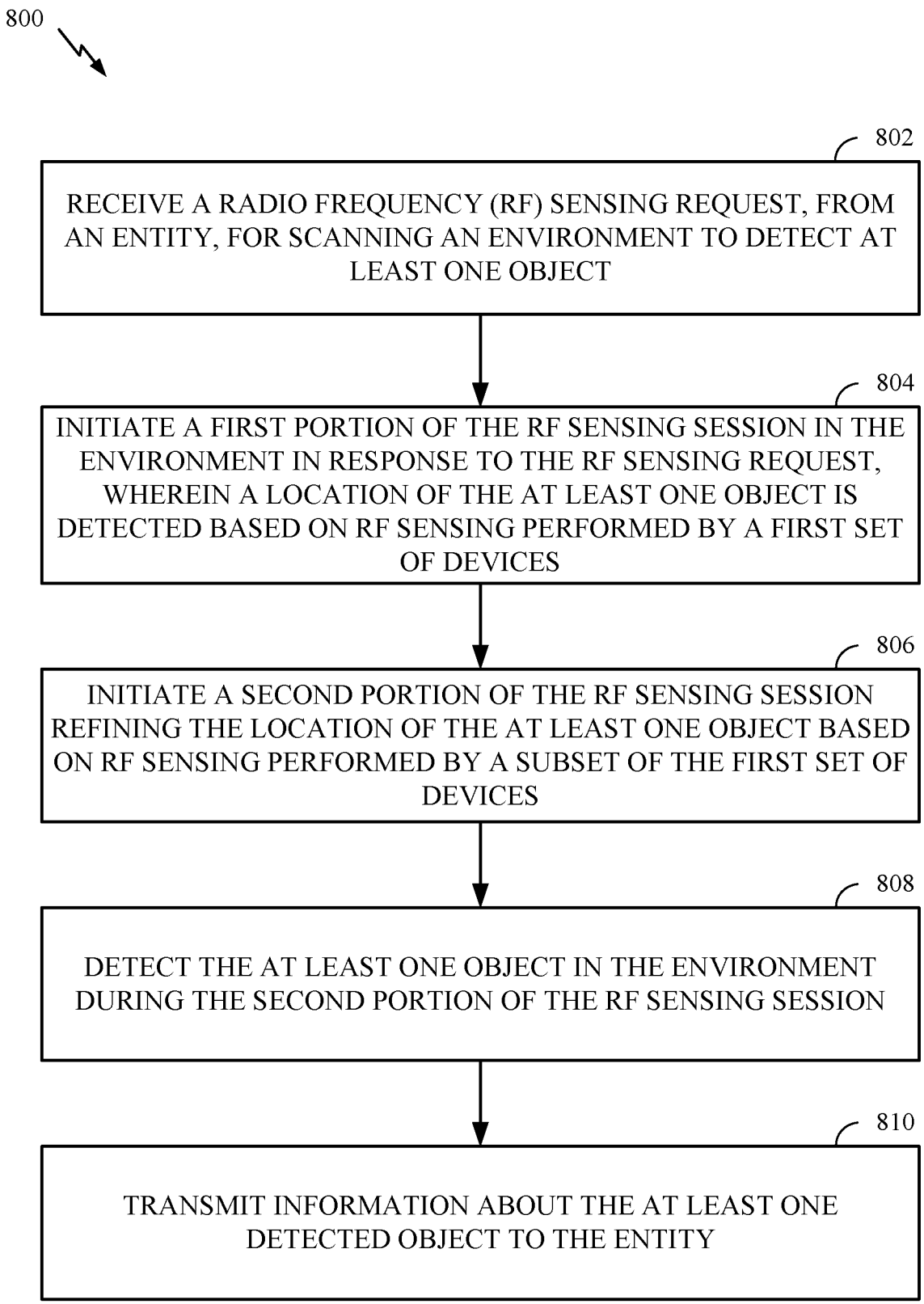
FIG. 8 is a flow diagram illustrating example operations for wireless communication by a sensing management function (SnMF) entity, in accordance with certain aspects of the present disclosure.

FIG. 8 is a flow diagram illustrating example operations 800 for wireless communication by an SnMF entity, in accordance with certain aspects of the present disclosure. The operations 800 may be performed, for example, by an SnMF, such as UE 120a, BS 110a, or network controller 130 in wireless communication network 100 of FIG. 1.

Operations 800 may be implemented as software components that are executed and run on one or more processors (e.g., controller/processor 240 or controller/processor 280 of FIG. 2). Further, the transmission and reception of signals by the SnMF in operations 800 may be enabled, for example, by one or more antennas (e.g., antennas 234 or 252 of FIG. 2). In certain aspects, the transmission and/or reception of signals by the SnMF may be implemented via a bus interface of one or more processors (e.g., controller/processor 240 or controller/processor 280) obtaining and/or outputting signals.

Operations 800 may begin, at block 802, by the SnMF receiving an RF sensing request, from an entity, for scanning an environment to detect at least one object. In aspects, the SnMF selects a set of devices to perform the sensing in response to the received RF sensing request. In aspects, the entity issuing a sensing request, does not have prior information regarding whether there are any objects in the environment.

The SnMF may select a set of devices for the RF sensing session including BSs, such as gNBs, UEs, or a combination of gNBs and UEs, wherein selecting the set of devices is based, at least in part, on a location of the gNBs, UEs, or the combination of gNBs and UEs. In one example, the SnMF may activate a combination of UEs and gNBs within the environment to identify target objects within signaling range of activated UEs and gNBs.

At block 804, the SnMF initiates a first portion of the RF sensing session in the environment in response to the RF sensing request, wherein a location of the at least one object is detected based on RF sensing performed by a first set of devices. The location of the at least one object detected based on RF sensing performed by the first set of devices may be a coarse location, which is further refined in the second portion of the RF sensing session. In certain aspects, the first set of devices perform the transmission/reception using the sensing parameters determined by the SnMF. Based on information received from the first set of devices, the SnMF may determine the presence/location of at least one object from the output of the sensing session. In certain aspects, the SnMF may configure a set of devices with sensing parameters for the RF sensing session, wherein the sensing parameters comprise at least one of: channel resource allocation, time resources, frequency resources, or spatial resources.

At block 806, the SnMF initiates a second portion of the RF sensing session refining the location of the at least one object based on RF sensing performed by a subset of the first set of devices. In some examples, the subset may further include at least one additional device not included in the first set of devices. Devices in the first set of devices, that are not part of the subset of the devices, may be deactivated from the first sensing session. In certain aspects, devices newly-added to the sensing session may be activated to participate in the sensing session.

The subset of devices for the second portion of the sensing session may be selected based, at least in part, on a location of devices of the first set of devices and/or the determined presence or coarse location of the first detected object. In certain aspects, the subset of devices may be determined based on the sensing output from the first portion of the sensing session. In some examples, the SnMF may configure at least one RF sensing parameter for the second portion of the RF sensing session via one of RRC signaling, MAC-CE, or DCI.

Both portions of the RF sensing session may be performed by a set of devices that simultaneously transmit RF signals and participate in data communication with other devices in the environment/network.

At block 808, the SnMF detects the at least one object in the environment during the second portion of the RF sensing session. More specifically, the SnMF may use received information from the subset of entities that participated in the second portion of the RF sensing session and determine a finer, refined, more accurate location (and/or velocity, acceleration, etc.) of the target object.

At block 810, the SnMF transmits information about the at least one detected object to the entity. In an example, the SnMF transmits the object's determined location, velocity, acceleration, etc. as determined based on the session.

While operations 800 of FIG. 8 illustrate a sensing request from a single entity, which can happen in a first portion and a second portion, in some cases, another sensing request, from a second entity, may coincide with the second portion of the first sensing session such that the SnMF adapts of the environment (e.g., node adaptation) is in a way to satisfies both the second sensing request from the second entity and also the second part of the sensing request from the first entity. Such a case is illustrated by operations 900 of FIG. 9.

Figure 9:
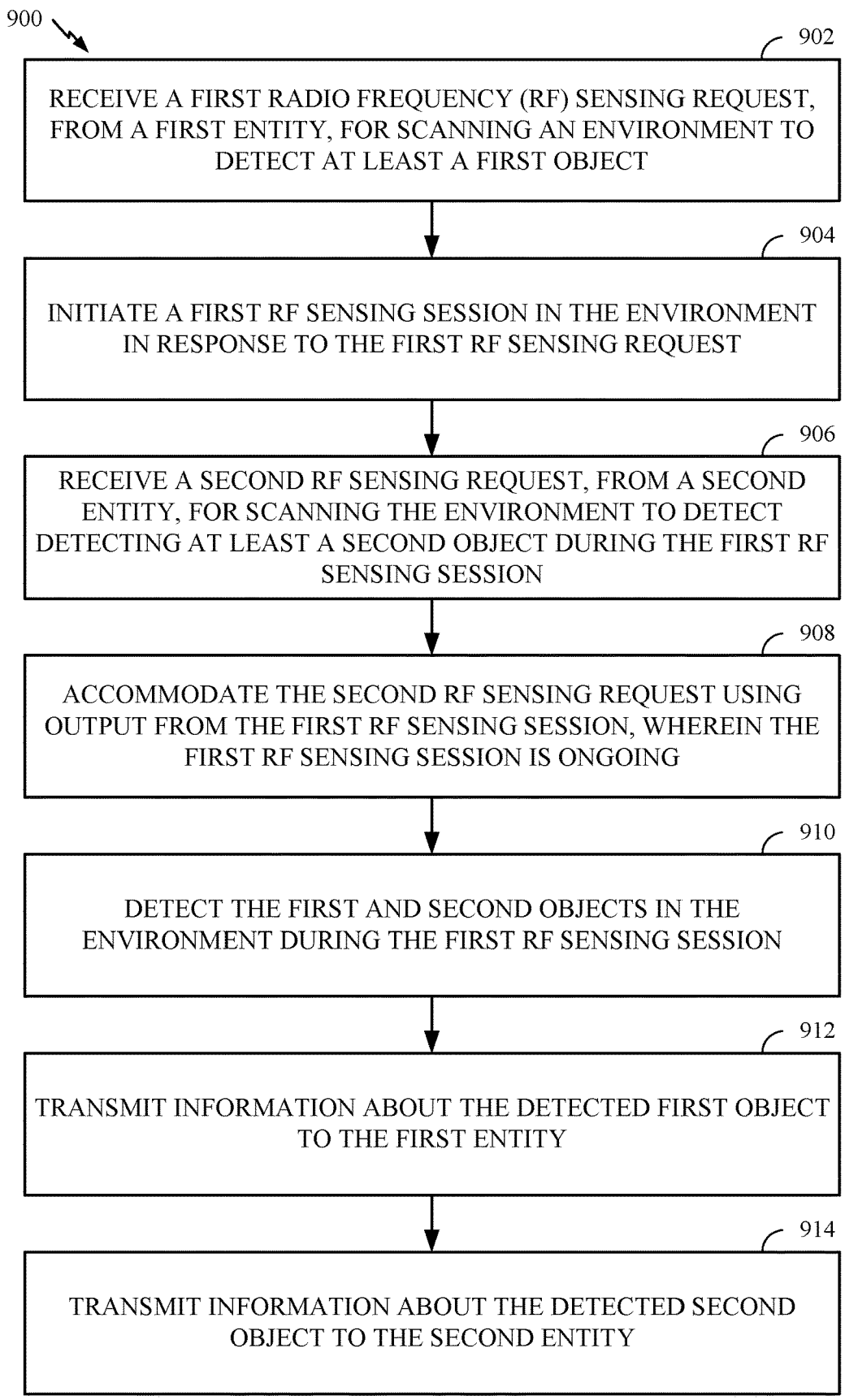
FIG. 9 is a flow diagram illustrating example operations for wireless communication by an SnMF entity, in accordance with certain aspects of the present disclosure.

FIG. 9 is a flow diagram illustrating example operations 900 for wireless communication by an SnMF, in accordance with certain aspects of the present disclosure. Operations 900 may be performed, for example, by an SnMF such as UE 120a, BS 110a, or network controller 130 in wireless communication network 100 of FIG. 1. Operations 900 may be implemented as software components that are executed and run on one or more processors (e.g., controller/processor 240 or controller/process 280 of FIG. 2). Further, the transmission and reception of signals by the SnMF in operations 900 may be enabled, for example, by one or more antennas (e.g., antennas 234 or antennas 252 of FIG. 2). In certain aspects, the transmission and/or reception of signals by the SnMF may be implemented via a bus interface of one or more processors (e.g., controller/processor 240 or controller/processor 280) obtaining and/or outputting signals.

Operations 900 may begin, at block 902, by an SnMF receiving a first RF sensing request, from a first entity, for scanning an environment to detect at least a first object.

At block 904, the SnMF may initiate a first RF sensing session in the environment in response to the first RF sensing request. To initiate the first RF sensing session, the SnMF may select a set of devices for the RF sensing session including BSs such as gNBs, UEs, or a combination of gNBs and UEs. The SnMF may select the set of devices based, at least in part, on a location of the gNBs, UEs, or the combination of gNBs and UEs. To initiate the first RF sensing session, the SnMF may configure a set of devices with sensing parameters for the RF sensing session. The sensing parameters may comprise at least one of: channel resource allocation, time resources, frequency resources, or spatial resources.

The first sensing session may include a first portion of the RF sensing session, wherein a presence, or a coarse location, of the first object is determined based on RF sensing performed by a first set of devices. A second portion of the RF sensing session, e.g., for refining the presence, or coarse location, of the sensed first object based on RF sensing, may be performed by a subset of the first set of devices. The subset may include at least one additional device not included in the first set of devices. Devices in the first set of devices that are not part of the subset of the devices may be deactivated from the first sensing session. The subset may be selected based, at in part, on a location of devices of the first set of devices and/or the determined coarse location of the first object. At least one of the first set of devices or the subset of devices may be determined based, at least in part, on information associated with the second object. The RF sensing session may be performed by a set of devices that simultaneously transmit RF signals and participate in data communication with other devices in a network.

At block 906, the SnMF receives a second RF sensing request, from a second entity, for scanning the environment to detect at least a second object during the first RF sensing session. The SnMF may configure at least one RF sensing parameter for the second portion of the RF sensing session via one of RRC signaling, MAC-CE, or DCI. As described above, this may allow the selected devices of the sensing session to adapt rapidly to the new configuration, thereby reducing power consumption and/or helping to optimize the traffic load in the network.

At block 908, the SnMF accommodates the second RF sensing request using output from the first RF sensing session, wherein the first RF sensing session is ongoing. In certain aspects, the SnMF may use the output of the first sensing session to accommodate the second request. In certain aspects, sensing parameters may be adjusted based on the second sensing requests so that both the first and second sensing requests are accommodated by a single sensing session. At certain times, the sensing parameters may not need not be adjusted to accommodate both sensing requests. In one example, an ongoing sensing session with one activated gNB may be sufficient to accommodate a first sensing request; however, the SnMF may modify the sensing session to include a second activated gNB in response to the second sensing request, received from the second entity, so that the single sensing session may satisfy both the first and second sensing requests.

At block 910, the SnMF detects the first and second objects in the environment during the first sensing session. More specifically, the SnMF may receive transmission/reception information from the activated devices participating in the sensing session and refine locations of the first and second target objects.

At block 912, the SnMF transmits information about the detected first object to the first entity that transmitted the sensing request for the first object. The information may include any information determined during the sensing session, such as location, velocity, acceleration, etc., of the first target object.

At block 914, the SnMF transmits information about the detected second object to the second entity that transmitted the sensing request for the second object. The information may include any information determined during the sensing session, such as location, velocity, acceleration, etc. of the second target object.

Figure 10:
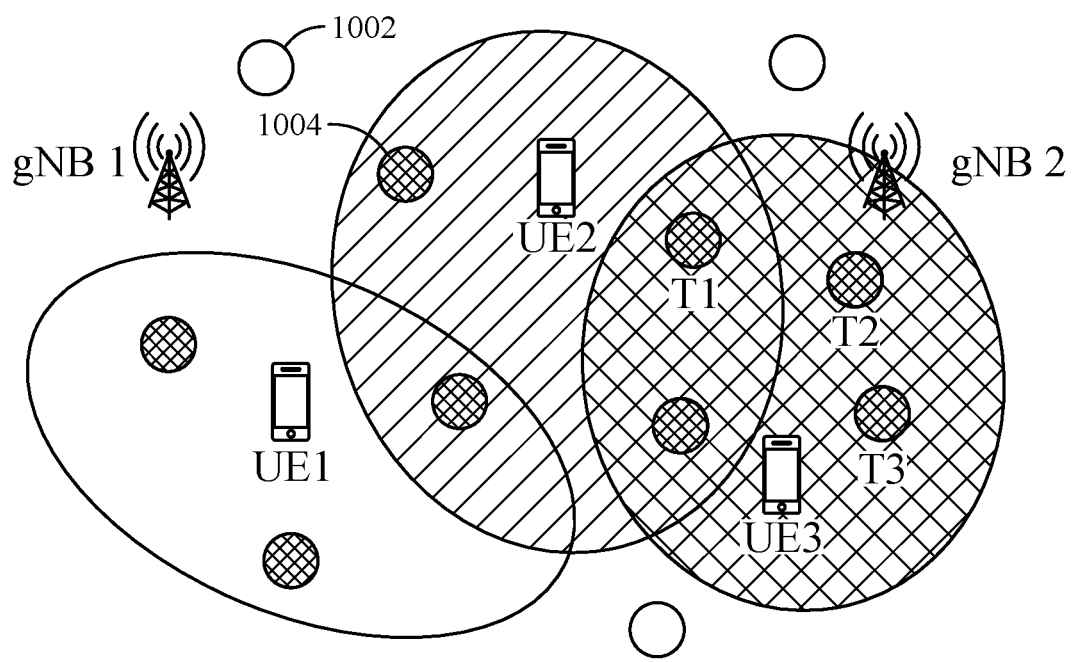
FIG. 10 is an example multi-static NR-based radar scheme conceptually illustrating refined sensing procedure, in accordance with certain aspects of the present disclosure.

An example of cooperative sensing 1000 is illustrated in FIG. 10. In particular, FIG. 10 is an example multi-static NR-based radar scheme conceptually illustrating a refined sensing procedure, in accordance with certain aspects of the present disclosure. In the example illustrate in FIG. 10, the BSs are configured as transmitters and UEs are configured as receivers.

First, an SnMF activates all BSs (i.e., gNB1 and gNB 2 shown in FIG. 10) and all UEs (i.e., UE1, UE2, and UE3 shown in FIG. 10) in the sensing session. The SnMF discovers a coarse location of all target objects 1004 within range of the nodes (i.e., all activated BSs and UEs). Target objects 1002 beyond the range of the nodes are not discovered. Based on initial target object discovery, specifically, whether an object exists and where the object is located, the SnMF may refine its estimation to a certain region in order to refine searching for and sensing the desired target object.

As an illustrative example, in one case, the SnMF may track target objects T1 and T2. To facilitate refined tracking for target objects T1 and T2, the SnMF may turn off reception from UE1 because it is geographically distant from desired target objects T1 and T2, and instead configure transmission from gNB1 and gNB2, and reception from UE2 and UE3.

As another illustrative example, in another case, the SnMF may refine tracking for target objects T2 and T3. To facilitate refined tracked for target objects T2 and T3, the SnMF may deactivate transmission from gNB1 and reception from nodes UE1 and UE2 because they are geographically distant from target objects T2 and T3, and instead configure transmission from gNB2 and reception from UE3. Alternatively, while UE2 may not receive reflections from T2, if T2 is moving, then UE2 may detect reflections from T2, so UE2 may remain active. The SnMF may choose to turn off reception from UE1 given its location is far from the region of interest (e.g., near target objects T2 and T3), while maintaining transmission from gNB1 and gNB2, and reception from UE2 and UE3.

Example Wireless Communication Device

Figure 11:
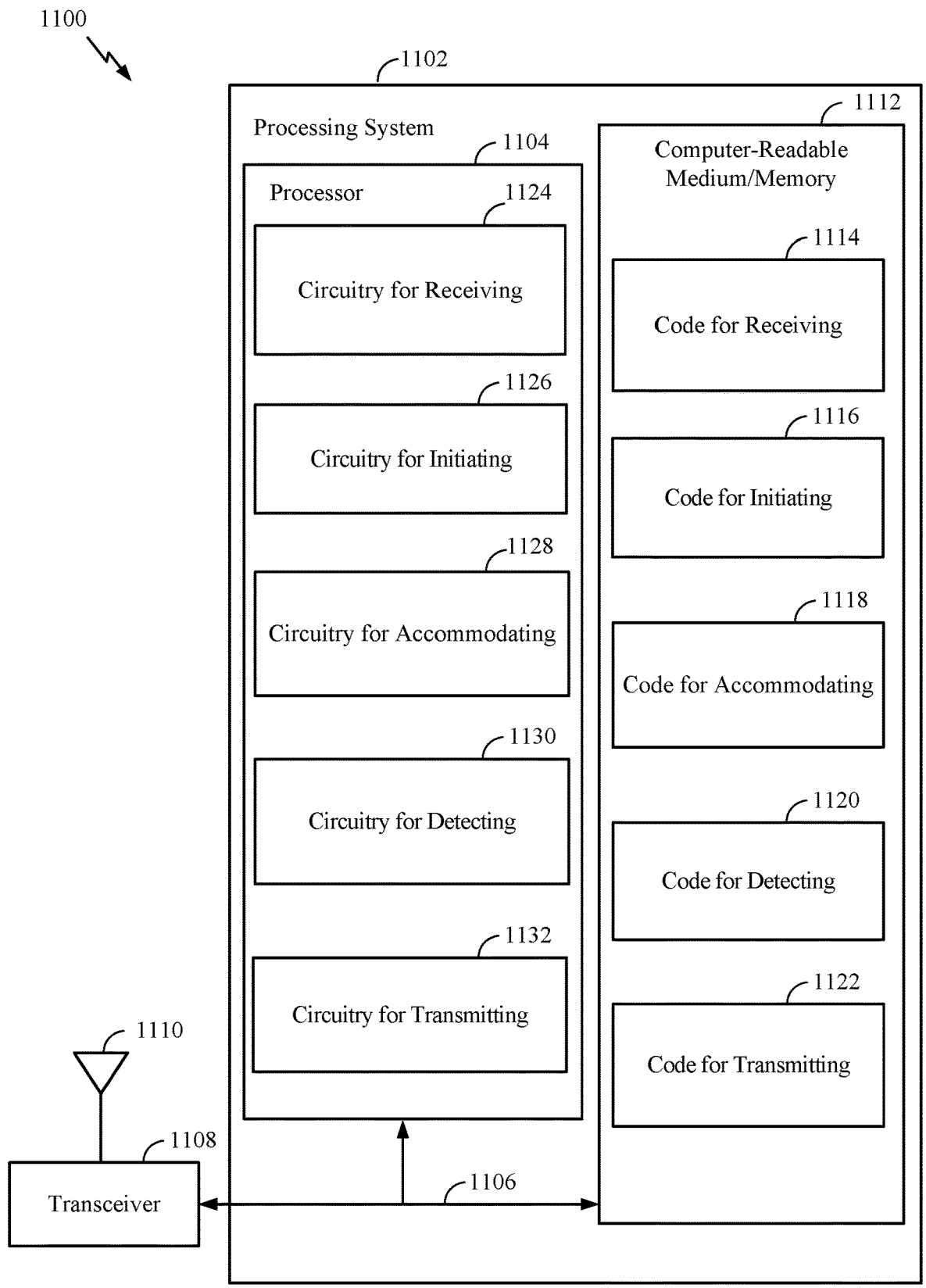
FIG. 11 illustrates a communications device that may include various components configured to perform operations for the techniques disclosed herein, in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8.

Communications device 1100 includes a processing system 1102 coupled to a transceiver 1108 (e.g., a transmitter and/or a receiver). Transceiver 1108 is configured to transmit and receive signals for communications device 1100 via an antenna 1110, such as the various signals as described herein. Processing system 1102 may be configured to perform processing functions for communications device 1100, including processing signals received and/or to be transmitted by communications device 1100.

Processing system 1102 includes a processor 1104 coupled to a computer-readable medium/memory 1112 via a bus 1106. In certain aspects, computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein for adaptive node activation and configuration in cooperative sensing.

In certain aspects, computer-readable medium/memory 1112 stores code 1114 for receiving: code 1116 for initiating; code 1118 for accommodating; code 1120 for detecting; and code 1122 for transmitting.

In some cases, code 1114 for receiving may include code for receiving a radio frequency (RF) sensing request, from an entity, for scanning an environment to detect at least one object. In some cases, code 1114 for receiving may include code for receiving a first RF sensing request, from a first entity, for scanning an environment to detect an at least a first object. In some cases, code 1114 for receiving may include code for receiving a second RF sensing request, from a second entity, for scanning the environment to detect at least a second object during the first RF sensing session.

In some cases, code 1116 for initiating may include code for initiating a first portion of the RF sensing session in the environment in response to the RF sensing request, wherein a location of the at least one object is detected based on RF sensing performed by a first set of devices. In some cases, code 1116 for initiating may include code for initiating a second portion of the RF sensing session refining the location of the at least one object based on RF sensing performed by a subset of the first set of devices. In some cases, code 1116 for initiating may include code for initiating a first RF sensing session in the environment in response to the first RF sensing request.

In some cases, code 1118 for accommodating may include code for accommodating the second RF sensing request using output from the first RF sensing session, wherein the first RF sensing session is ongoing.

In some cases, code 1120 for detecting may include code for detecting the at least one object in the environment during the second portion of the RF sensing session. In some cases, code 1120 for detecting may include code for detecting the first and second objects in the environment during the first sensing session.

In some cases, code 1122 transmitting may include code for transmitting information about the at least one detected object to the first entity. In some cases, code 1122 for transmitting may include code for transmitting information about the detected first object to the first entity. In some cases, code 1122 for transmitting may include code for transmitting information about the detected second object to the second entity.

In certain aspects, processor 1104 has circuitry configured to implement the code stored in computer-readable medium/memory 1112. For example, processor 1104 includes circuitry 1124 for receiving, circuitry 1126 for initiating, circuitry 1128 for accommodating, circuitry 1130 for detecting, and circuitry 1132 for transmitting.

In some cases, circuitry 1124 for receiving may include circuitry for receiving an RF sensing request, from an entity, for scanning an environment to detect at least one object. In some cases, circuitry 1124 for receiving may include circuitry for receiving a first RF sensing request, from a first entity, for scanning an environment to detect an at least a first object. In some cases, circuitry 1124 for receiving may include circuitry 1124 for receiving a second RF sensing request, from a second entity, for scanning the environment to detect at least a second object during the first RF sensing session.

In some cases, circuitry 1126 for initiating may include circuitry for initiating a first portion of the RF sensing session in the environment in response to the RF sensing request, wherein a location of the at least one object is detected based on RF sensing performed by a first set of devices. In some cases, circuitry 1126 for initiating may include circuitry for initiating a second portion of the RF sensing session refining the location of the at least one object based on RF sensing performed by a subset of the first set of devices. In some cases, circuitry 1126 for initiating may include circuitry for initiating a first RF sensing session in the environment in response to the first RF sensing request.

In some cases, circuitry 1128 for accommodating may include circuitry for accommodating the second RF sensing request using output from the first RF sensing session, wherein the first RF sensing session is ongoing.

In some cases, circuitry 1130 for detecting may include circuitry for detecting the at least one object in the environment during the second portion of the RF sensing session. In some cases, circuitry 1130 for detecting may include circuitry for detecting the first and second objects in the environment during the first sensing session.

In some cases, circuitry 1132 for transmitting may include circuitry for transmitting information about the at least one detected object to the first entity. In some cases, circuitry 1132 for transmitting may include circuitry for transmitting information about the detected first object to the first entity. In some cases, circuitry 1132 for transmitting may include circuitry for transmitting information about the detected second object to the second entity.

In some cases, the operations illustrated in FIGS. 8 and 9, as well as other operations described herein for UE antenna panel distribution reporting, may be implemented by one or means-plus-function components. For example, in some cases, such operations may be implemented by means for receiving (or means for obtaining), means for initiating, means for accommodating, means for detecting, and means for transmitting (or means for outputting for transmission).

In some cases, means for transmitting (or means for outputting for transmission) includes a transmitter unit 232 and/or an antenna(s) 234 of BS 110a illustrated in FIG. 2 or transmitter unit 254 and/or antenna(s) 252 of UE 120a illustrated in FIG. 2 and/or circuitry 1132 for of communications device 1100 in FIG. 11.

In some cases, means for receiving (or means for obtaining) includes a receiver and/or antenna(s) 234 of BS 110a or a receiver and/or antenna(s) 252 of UE 120a illustrated in FIG. 2 and/or circuitry 1124 for receiving of communications device 1100 in FIG. 11.

In some cases, means for initiating, means for accommodating, and means for detecting includes a processing system, which may include one or more processors, such as transmit processor 220, TX MIMO processor 230, receive processor 238, and/or controller/processor 240 of BS 110a illustrated in FIG. 2 or receive processor 258, transmit processor 264, TX MIMO processor 266, and/or controller/processor 280 of UE 120a illustrated in FIG. 2, circuitry 1126 for initiating, circuitry 1128 for accommodating, and/or circuitry 1130 for detecting of communications device 1100 of FIG. 11, and/or processing system 1102 of communications device 1100 in FIG. 11.

Example Clauses

Implementation examples are described in the following numbered clauses:

Clause 1: A method for wireless communication, comprising: receiving a first radio frequency (RF) sensing request, from a first entity, for scanning an environment to detect at least a first object; initiating a first RF sensing session in the environment in response to the first RF sensing request; receiving a second RF sensing request, from a second entity, for scanning the environment to detect at least a second object during the first RF sensing session; accommodating the second RF sensing request using output from the first RF sensing session, wherein the first RF sensing session is ongoing; detecting the first and second objects in the environment during the first RF sensing session; transmitting information about the detected first object to the first entity; and transmitting information about the detected second object to the second entity.

Clause 2: The method of Clause 1, wherein initiating the first RF sensing session comprises: selecting a set of devices for the RF sensing session including next generation NodeBs (gNBs), user equipments (UEs), or a combination of gNBs and UEs.

Clause 3: The method of Clause 2, wherein selecting the set of devices is based, at least in part, on a location of the gNBs, UEs, or the combination of gNBs and UEs.

Clause 4: The method of Clause 2 or 3, wherein accommodating the second RF sensing request comprises: adjusting the set of devices for the RF sensing session based, at least in part, on the second RF sensing request.

Clause 5: The method of any of Clauses 1-4, wherein initiating the first RF sensing session comprises: configuring a set of devices with sensing parameters for the RF sensing session.

Clause 6: The method of Clause 5, wherein the sensing parameters comprise at least one of: channel resource allocation, time resources, frequency resources, or spatial resources.

Clause 7: The method of Clause 5 or 6, wherein accommodating the second RF sensing request comprises: adjusting at least one of the sensing parameters for the RF sensing session to satisfy both the first and second RF sensing requests.

Clause 8: The method of any of Clauses 1-7, wherein the first RF sensing session comprises: a first portion of the RF sensing session, wherein a location of at least the first object is detected based on RF sensing performed by a first set of devices; and a second portion of the RF sensing session refining the location of the first object based on RF sensing performed by a subset of the first set of devices.

Clause 9: The method of Clause 8, wherein the subset further includes at least one additional device not included in the first set of devices.

Clause 10: The method of Clause 8 or 9, wherein devices in the first set of devices that are not part of the subset of the devices are deactivated from the first RF sensing session.

Clause 11: The method of any of Clauses 8-10, wherein the subset is selected based, at in part, on a location of devices of the first set of devices and the detected location of the first object based on the RF sensing performed by the first set of devices.

Clause 12: The method of any of Clauses 8-11, wherein at least one of the first set of devices or the subset is determined based, at least in part, on information associated with the second object.

Clause 13: The method of any of Clauses 8-12, further comprising: configuring at least one RF sensing parameter for the second portion of the RF sensing session via one of radio resource control (RRC) signaling, media access control (MAC) control element (CE), or downlink control information (DCI).

Clause 14: The method of any of Clauses 1-13, wherein the RF sensing session is performed by a set of devices that simultaneously transmit RF signals and participate in data communication with other devices in the environment.

Clause 15: A method for wireless communication, comprising: receiving a radio frequency (RF) sensing request, from an entity, for scanning an environment to detect at least one object; initiating a first portion of an RF sensing session in the environment in response to the RF sensing request, wherein a location of the at least one object is detected based on RF sensing performed by a first set of devices; initiating a second portion of the RF sensing session refining the location of the at least one object based on RF sensing performed by a subset of the first set of devices; detecting the at least one object in the environment during the second portion of the RF sensing session; and transmitting information about the at least one detected object to the entity.

Clause 16: The method of Clause 15, wherein initiating the first portion of the RF sensing session comprises: selecting a set of devices for the first portion of the RF sensing session including next generation NodeBs (gNBs), user equipments (UEs), or a combination of gNBs and UEs.

Clause 17: The method of Clause 16, wherein selecting the set of devices is based, at least in part, on a location of the gNBs, UEs, or the combination of gNBs and UEs.

Clause 18: The method of any of Clauses 15-17, wherein initiating the first portion of the RF sensing session comprises: configuring a set of devices with sensing parameters for the first portion of the RF sensing session.

Clause 19: The method of Clause 18, wherein the sensing parameters comprise at least one of: channel resource allocation, time resources, frequency resources, or spatial resources.

Clause 20: The method of any of Clauses 15-19, wherein the subset further includes at least one additional device not included in the first set of devices.

Clause 21: The method of any of Clauses 15-20, wherein devices in the first set of devices that are not part of the subset of the devices are deactivated from the first portion of the RF sensing session.

Clause 22: The method of any of Clauses 15-21, wherein the subset is selected based, at in part, on a location of devices of the first set of devices and the detected location of the at least one object based on the RF sensing performed by the first set of devices.

Clause 23: The method of any of Clauses 15-22, further comprising: configuring at least one RF sensing parameter for the second portion of the RF sensing session via one of radio resource control (RRC) signaling, media access control (MAC) control element (CE), or downlink control information (DCI).

Clause 24: The method of any of Clauses 15-23, wherein the first set of devices comprise devices that simultaneously transmit RF signals and participate in data communication with other devices in the environment.

Clause 25: An apparatus, comprising: at least one processor; and a memory coupled to the at least one processor, the memory including instructions executable by the at least one processor to cause the apparatus to perform a method in accordance with any one of Clauses 1-24.

Clause 26: An apparatus, comprising means for performing a method in accordance with any one of Clauses 1-24.

Clause 27: A non-transitory computer-readable medium comprising executable instructions that, when executed by one or more processors of an apparatus, cause the apparatus to perform a method in accordance with any one of Clauses 1-24.

Clause 28: A computer program product for wireless communication embodied on a computer-readable storage medium comprising code for performing a method in accordance with any one of Clauses 1-24.

Additional Wireless Communication Network Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8 and/or FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication, comprising:
receiving a first radio frequency (RF) sensing request, from a first entity, for scanning an environment to detect at least a first object;
initiating a first RF sensing session in the environment in response to the first RF sensing request;
receiving a second RF sensing request, from a second entity, for scanning the environment to detect at least a second object during the first RF sensing session;
accommodating the second RF sensing request using output from the first RF sensing session, wherein the first RF sensing session is ongoing;
detecting the first object and the second object in the environment during the first RF sensing session;
transmitting information about the detected first object to the first entity; and
transmitting information about the detected second object to the second entity.

2. The method of claim 1, wherein initiating the first RF sensing session comprises:
selecting a set of devices for the RF sensing session including next generation NodeBs (gNBs), user equipments (UEs), or a combination of gNBs and UEs.

3. The method of claim 2, wherein selecting the set of devices is based, at least in part, on a location of the gNBs, UEs, or the combination of gNBs and UEs.

4. The method of claim 2, wherein accommodating the second RF sensing request comprises:
adjusting the set of devices for the RF sensing session based, at least in part, on the second RF sensing request.

5. The method of claim 1, wherein initiating the first RF sensing session comprises:
configuring a set of devices with sensing parameters for the RF sensing session.

6. The method of claim 5, wherein the sensing parameters comprise at least one of: channel resource allocation, time resources, frequency resources, or spatial resources.

7. The method of claim 5, wherein accommodating the second RF sensing request comprises:
adjusting at least one of the sensing parameters for the RF sensing session to satisfy both the first and second RF sensing requests.

8. The method of claim 1, wherein the first RF sensing session comprises:
a first portion of the RF sensing session, wherein a location of at least the first object is detected based on RF sensing performed by a first set of devices; and
a second portion of the RF sensing session refining the location of the first object based on RF sensing performed by a subset of the first set of devices.

9. The method of claim 8, wherein the subset further includes at least one additional device not included in the first set of devices.

10. The method of claim 8, wherein devices in the first set of devices that are not part of the subset of the devices are deactivated from the first RF sensing session.

11. The method of claim 8, wherein the subset is selected based, at in part, on a location of devices of the first set of devices and the location of the first object based on the RF sensing performed by the first set of devices.

12. The method of claim 8, wherein at least one of the first set of devices or the subset is determined based, at least in part, on information associated with the second object.

13. The method of claim 8, further comprising:
configuring at least one RF sensing parameter for the second portion of the RF sensing session via one of radio resource control (RRC) signaling, media access control (MAC) control element (CE), or downlink control information (DCI).

14. The method of claim 1, wherein the RF sensing session is performed by a set of devices that simultaneously transmit RF signals and participate in data communication with other devices in the environment.

15. A method for wireless communication, comprising:
receiving a radio frequency (RF) sensing request, from an entity, for scanning an environment to detect at least one object;
initiating a first portion of an RF sensing session in the environment in response to the RF sensing request, wherein a location of the at least one object is detected based on RF sensing performed by a first set of devices;
initiating a second portion of the RF sensing session refining the location of the at least one object based on RF sensing performed by a subset of the first set of devices;
detecting the at least one object in the environment during the second portion of the RF sensing session; and
transmitting information about the at least one detected object to the entity.

16. The method of claim 15, wherein initiating the first portion of the RF sensing session comprises:
selecting a set of devices for the first portion of the RF sensing session including next generation NodeBs (gNBs), user equipments (UEs), or a combination of gNBs and UEs.

17. The method of claim 16, wherein selecting the set of devices is based, at least in part, on a location of the gNBs, UEs, or the combination of gNBs and UEs.

18. The method of claim 15, wherein initiating the first portion of the RF sensing session comprises:
configuring a set of devices with sensing parameters for the first portion of the RF sensing session.

19. The method of claim 18, wherein the sensing parameters comprise at least one of: channel resource allocation, time resources, frequency resources, or spatial resources.

20. The method of claim 15, wherein the subset further includes at least one additional device not included in the first set of devices.

21. The method of claim 15, wherein devices in the first set of devices that are not part of the subset of the devices are deactivated from the first portion of the RF sensing session.

22. The method of claim 15, wherein the subset is selected based, at in part, on a location of devices of the first set of devices and the location of the at least one object based on the RF sensing performed by the first set of devices.

23. The method of claim 15, further comprising:
configuring at least one RF sensing parameter for the second portion of the RF sensing session via one of radio resource control (RRC) signaling, media access control (MAC) control element (CE), or downlink control information (DCI).

24. The method of claim 15, wherein the first set of devices comprise devices that simultaneously transmit RF signals and participate in data communication with other devices in the environment.

25. An apparatus for wireless communication, comprising:
at least one processor; and
a memory coupled to the at least one processor, the memory including instructions executable by the at least one processor to cause the apparatus to:
receive a first radio frequency (RF) sensing request, from a first entity, for scanning an environment to detect at least a first object;
initiate a first RF sensing session in the environment in response to the first RF sensing request;
receive a second RF sensing request, from a second entity, for scanning the environment to detect at least a second object during the first RF sensing session;
accommodate the second RF sensing request using output from the first RF sensing session, wherein the first RF sensing session is ongoing;
detect the first object and the second object in the environment during the first RF sensing session;
transmit information about the detected first object to the first entity; and
transmit information about the detected second object to the second entity.

26. The apparatus of claim 25, wherein the instructions executable by the at least one processor to cause the apparatus to initiate the first RF sensing session comprise instructions executable by the at least one processor to cause the apparatus to:
select a set of devices for the RF sensing session including next generation NodeBs (gNBs), user equipments (UEs), or a combination of gNBs and UEs.

27. The apparatus of claim 26, wherein selecting the set of devices is based, at least in part, on a location of the gNBs, UEs, or the combination of gNBs and UEs.

28. The apparatus of claim 26, wherein the instructions executable by the at least one processor to cause the apparatus to accommodate the second RF sensing request comprise instructions executable by the at least one processor to cause the apparatus to:
adjust the set of devices for the RF sensing session based, at least in part, on the second RF sensing request.

29. An apparatus for wireless communication, comprising:
at least one processor; and
a memory coupled to the at least one processor, the memory including instructions executable by the at least one processor to cause the apparatus to:
receive a radio frequency (RF) sensing request, from an entity, for scanning an environment to detect at least one object;
initiate a first portion of a RF sensing session in the environment in response to the RF sensing request, wherein a location of the at least one object is detected based on RF sensing performed by a first set of devices;
initiate a second portion of the RF sensing session refining the location of the at least one object based on RF sensing performed by a subset of the first set of devices;
detect the at least one object in the environment during the second portion of the RF sensing session; and
transmit information about the at least one detected object to the entity.

30. The apparatus of claim 29, wherein the instructions executable by the at least one processor to cause the apparatus to initiate the first portion of the RF sensing session comprise instructions executable by the at least one processor to cause the apparatus to:
select a set of devices for the first portion of the RF sensing session including next generation NodeBs (gNBs), user equipments (UEs), or a combination of gNBs and UEs.

* * * * *